March 26, 1968

L. H. BRIXNER 3,375,465

ALKALI COMPENSATED RARE EARTH DOPED ZINC
OR CADMIUM BORATE PHOSPHORS

Filed Nov. 25, 1964

INVENTOR

LOTHAR H. BRIXNER

BY

*Fred C. Carlson*

ATTORNEY

INVENTOR
LOTHAR H. BRIXNER

BY
Fred C. Carlson
ATTORNEY

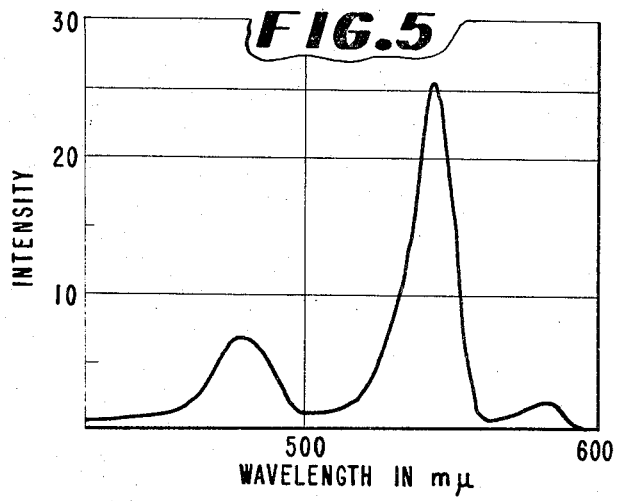
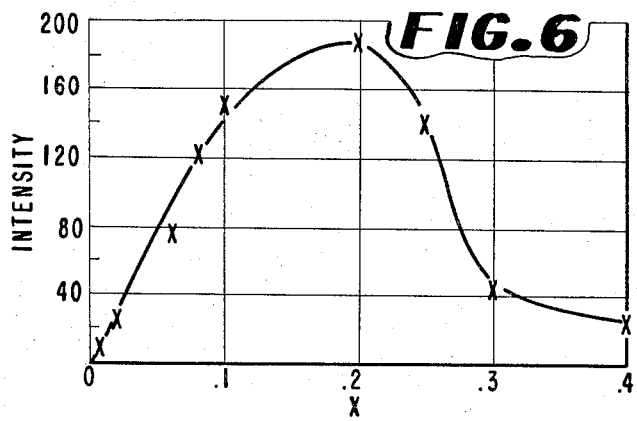
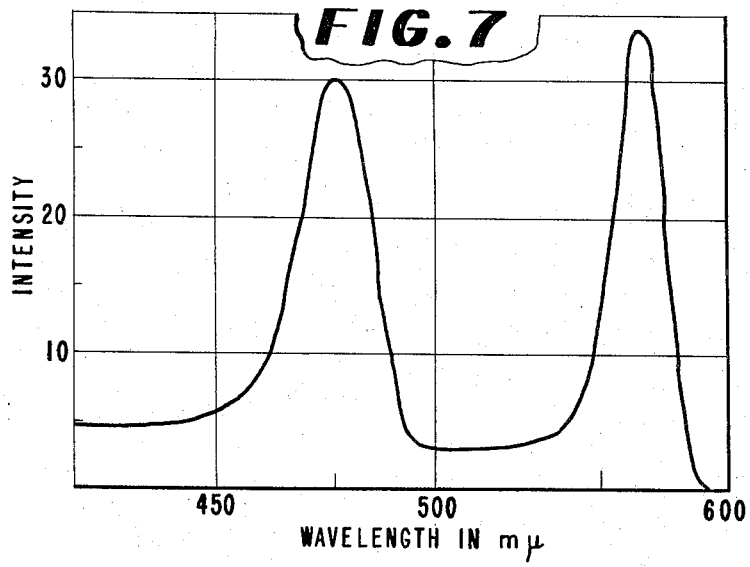

March 26, 1968 L. H. BRIXNER 3,375,465
ALKALI COMPENSATED RARE EARTH DOPED ZINC
OR CADMIUM BORATE PHOSPHORS
Filed Nov. 25, 1964 4 Sheets-Sheet 4
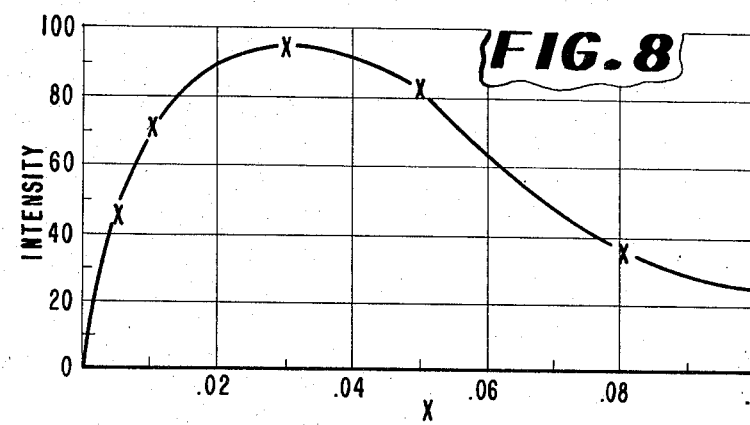
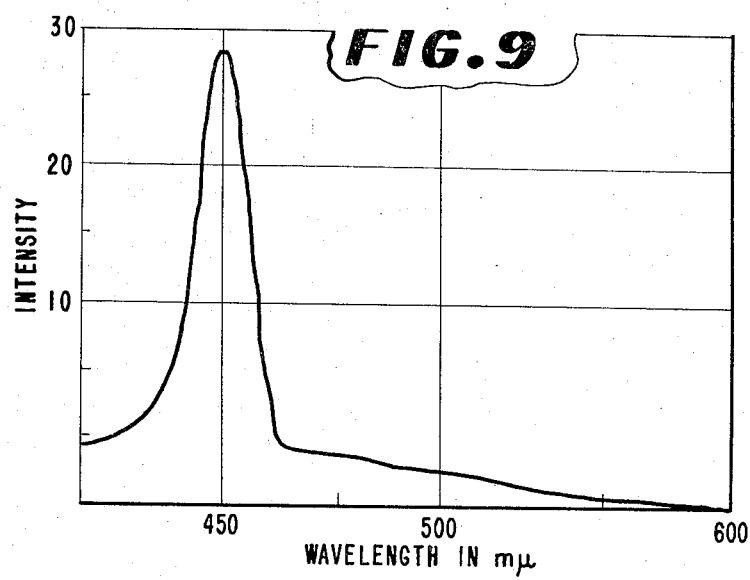
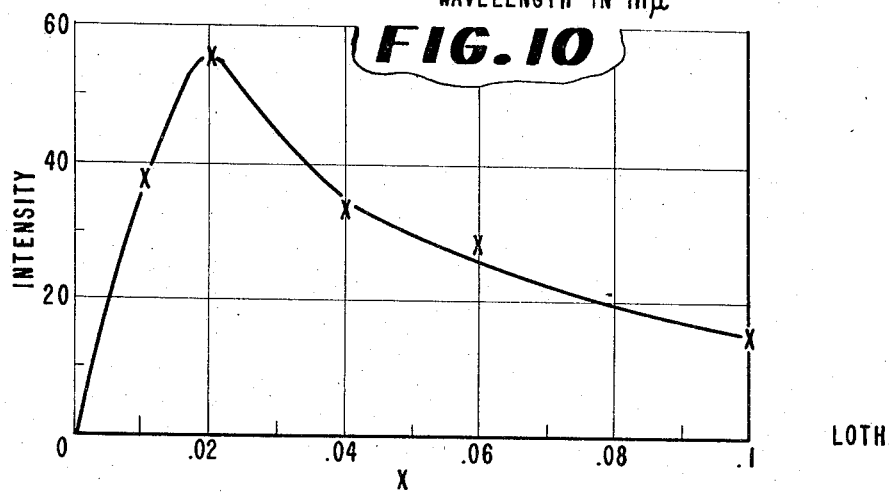
INVENTOR
LOTHAR H. BRIXNER
BY
Fred C. Carlson
ATTORNEY

United States Patent Office 3,375,465
Patented Mar. 26, 1968

3,375,465
ALKALI COMPENSATED RARE EARTH DOPED ZINC OR CADMIUM BORATE PHOSPHORS
Lothar H. Brixner, West Chester, Pa., assignor to E. I. du Pont de Nemours and Company, Wilmington, Del., a corporation of Delaware
Filed Nov. 25, 1964, Ser. No. 413,827
11 Claims. (Cl. 331—94.5)

ABSTRACT OF THE DISCLOSURE

Novel single-phase solid-solution compounds of the formula $Ln_x^{+3}Na_x^{+1}A_{1-2x}^{+2}B_2O_4$ where Ln is a rare earth element of atomic number 60, 62, 63, 65, 66, or 69; A is cadmium or zinc; and $x$ has a value of from 0.01 to 0.3, have been prepared and found to emit radiation over a very narrow range of spectral wavelength, making them useful as phosphors in general and more specifically as laser crystals.

Figure 1:
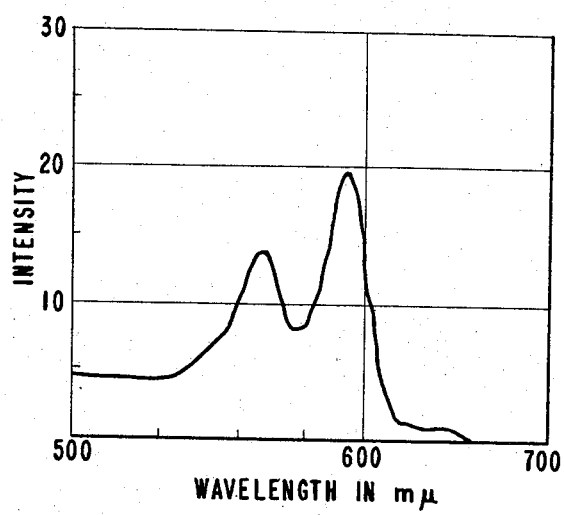

This invention relates to novel luminescent compositions and methods for making them, and is more particularly directed to such compositions which are single-phase, solid solution compounds of the formula $$Ln_x^{+3}Na_x^{+1}A_{1-2x}^{+2}B_2O_4$$

where Ln is a rare earth element of atomic number 60, 62, 63, 65, 66 or 69, $A^{+2}$ is an element selected from the group consisting of $Zn^{+2}$ and $Cd^{+2}$ and $x$ has a value of from 0.1 to 0.3, and which comprise zinc or cadmium borate in which the indicated proportion of zinc or cadmium ion has been replaced with a rare earth element ion and electroneutrality restored with the indicated proportion of sodium ion. The invention is futher particularly directed to the steps, in processes for making these compounds, comprising (1) intimately mixing oxygen-containing compounds (a) of a said rare earth element, (b) sodium, (c) of the element selected from the group consisting of zinc and cadmium, and (d) boron in the stoichiometric amounts of said formula, (2) heating the mixture at a temperature of about 1200° for about from 10 to 60 minutes, and (3) cooling the product.

In the drawings:

FIGURES 1, 3, 5, 7 and 9 are graphs of intensity of fluorescent emission in arbitrary units plotted against wavelength in millimicrons for certain compositions of the invention, and FIGURES 2, 4, 6, 8 and 10 are graphs of intensity of fluorescent emission in arbitary units plotted as a function of coefficient $x$ in the above formula, for certain compositions of the invention.

The compositions of the invention are useful in a number of applications because of their outsanding luminescent properties. In powdered form they are useful as TV phosphors, X-ray, electron and neutron detectors and can be used for the production of different colors of light under excitation in the range of 2000 A. to 4000 A., such as is produced by a mercury vapor lamp. Because of the high Verdet constant (for definition, see The Van Norstrand's Chemists Dictionary, 1953, p. 729 of $Dy^{+3}$ and $Tb^{+3}$ they can further find use as Faraday modulators. Because the light emission under ultra violet excitation is extremely intense within a very narrow wavelength band, the compositions can be designated as "line-emitters" and as such are useful as solid-state "laser" crystals. The term "laser" is a well-known acronym for light amplification by stimulated emission of radiation. The compositions herein described can be prepared in the form of glass-like castings of high optical perfection, making them especially useful in optical application where specific shapes are desirable or necessary.

Any trivalent rare earth ion may be incorporated into zinc or cadmium borate along with a requisite amount of sodium to restore electroneutrality to produce a compound of the generic formula given above; however, a detailed study has been made of compounds resulting from the substitution of the rare earth elements samarium, europium, terbium, dysprosium, and thulium since it was found that these substituted borates gave intense fluorescence in the visible spectrum, and were all sharp "line-emitters," a primary requirement for laser action. For these five rare earth elements, optimum concentration levels for substitution in the zinc borate lattice were determined as a function of intensity of fluorescent emission.

In making novel compositions of this invention, the powdered component oxides, or compounds from which oxides are derived upon heating, were weighed to the nearest one-tenth milligram the amounts being calculated according to the desired stoichiometry. The mixed powders were charged into a platinum tube and the temperature gradually increased to 1200° C. To assure complete reaction and a homogeneous melt, the temperature was held at 1200° C. for 10 to 20 minutes and then gradually lowered. After cooling to room temperature, the glass-like solids were easily removed from the platinum tube.

In some cases the zinc borate, $ZnB_2O_4$, or cadmium borate, $CdB_2O_4$, was prepared in a separate reaction by heating stoichiometic quantities of boric acid and ZnO or CdO according to the equations:

$$ZnO + 2H_3BO_3 \rightarrow ZnB_2O_4 + 3H_2O$$

or $$CdO + 2H_3BO_3 \rightarrow CdB_2O_4 + 3H_2O$$

The zinc oxide or cadmium oxide and boric acid were mixed and slowly heated to 300° C. and held at this temperature until all of the water had been driven off. It was found unnecessary, however, to prepare the zinc borate or cadmium borate in such a preliminary reaction; rather, the stoichiometric quantities of zinc oxide or cadmium oxide and boric acid could be mixed with the required amounts of rare earth oxides and sodium carbonate to form the desired rare earth-sodium-substituted zinc or cadmium borate, water, and carbon dioxide. In the examples given below, therefore, weights of zinc borate are given in some cases, where it was prepared in a preliminary reaction, and in other cases weights of zinc oxide or cadmium carbonate and boric acid are given where these were mixed directly with the sodium carbonate and rare earth oxide.

The reactants used in the preparation of the compounds described herein were of the best commercially available purity. The rare earth oxides were obtained from Lindsay Chemical Division, American Potash and Chemical Corp.

The novel compositions were tested for fluorescent emission by means of a Beckmann DK2 recording spectrometer, using a mercury-plus-phosphor lamp F4T5/BL (General Electric Co.) through a Schott U.G.–11 filter. The detector used was a 1P28 RCA photomultiplier tube.

The invention will be better understood by reference to the following illustrative examples, which are not to be construed as limiting except as indicated in the appended claims.

Example 1

To prepare a rare earth- and sodium-substituted zinc borate compound of the formula $Sm_{0.01}Na_{0.01}Zn_{0.98}B_2O_4$, stoichiometric quantities of $Sm_2O_3$, $Na_2CO_3$, $H_3BO_3$, and $ZnB_2O_4$ were weighed according to the following equation:

$$0.005Sm_2O_3 + 0.005Na_2CO_3 + 0.98ZnB_2O_4 + 0.04H_3BO_3 \rightarrow$$
$$Sm_{0.01}Na_{0.01}Zn_{0.98}B_2O_4 + 0.06H_2O + 0.005CO_2$$

The amounts used, weighed to the nearest 0.1 mg., were as follows:

| | G. |
|---|---|
| $Sm_2O_3$ | 0.2946 |
| $Na_2CO_3$ | 0.0895 |
| $H_3BO_3$ | 0.4175 |
| $ZnB_2O_4$ | 25.00 |

These powders were thoroughly mixed and placed in a platinum tube, closed at one end, of ½″ diameter. This tube, with the powder charge was placed in a furnace and heated to a temperature of 1200° C. This temperature was maintained for a period of 10 minutes, after which the furnace was slowly cooled at the rate of 1° C./minute to room temperature. The platinum tube was peeled from the glass bar and several parts of the bar were examined to determine fluorescent emission properties. The characteristic emission spectrum is given in FIGURE 1.

*Examples 2 through 5*

In the manner of Example 1, four other samarium-sodium-substituted zinc borates were prepared and tested for fluorescent emission. For the preparation of these compositions the following amounts of samarium oxide, sodium carbonate, boric acid and zinc oxide were reacted:

| Example | Composition Prepared | $Sm_2O_3$ | $Na_2CO_3$ | $H_3BO_3$ | ZnO |
|---|---|---|---|---|---|
| 2 | $Sm_{0.02}Na_{0.02}Zn_{0.96}B_2O_4$ | 0.1339 | 0.0377 | 4.7496 | 3.0000 |
| 3 | $Sm_{0.04}Na_{0.04}Zn_{0.92}B_2O_4$ | 0.2795 | .0849 | 4.9560 | 3.0000 |
| 4 | $Sm_{0.05}Na_{0.05}Zn_{0.90}B_2O_4$ | 0.3571 | 0.1085 | 5.0663 | 3.0000 |
| 5 | $Sm_{0.06}Na_{0.06}Zn_{0.88}B_2O_4$ | 0.4383 | 0.1332 | 5.1813 | 3.0000 |

Each of these compounds was tested for fluorescent emission and each was found to fluoresce strongly in a narrow spectrum range at a wave length of 550 to 600 m$\mu$.

Figure 2:
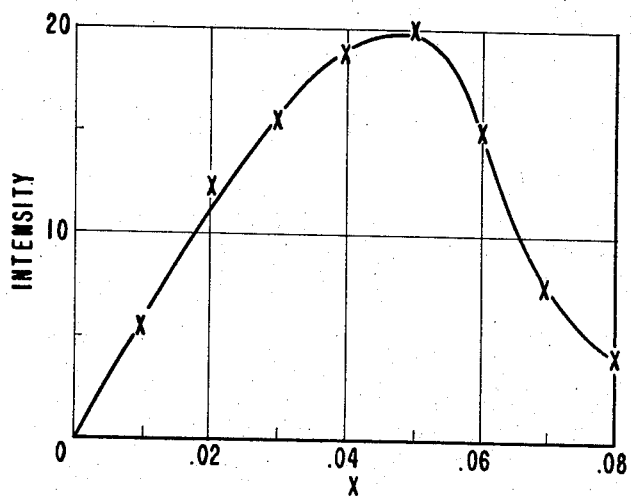

Maximum intensity of fluorescence for the five samarium-sodium substituted borates was found for the composition $Sm_{0.05}Na_{0.05}Zn_{0.90}B_2O_4$. FIGURE 2 shows a graph of the intensity of fluorescence for the compounds of Examples 1 through 5, plotted as a function of $x$ in the generic formula $Sm_xNa_xZn_{1-2x}B_2O_4$ where $x$ is 0.01 to 0.08.

*Examples 6 through 10*

Using the procedure of Example 1, europium-sodium-substituted zinc borates were prepared having the composition $Eu_xNa_xZn_{1-2x}B_2O_4$, where $x$ had values of 0.01, 0.05, 0.2, 0.3, 0.4, 0.5. In each case the weights of powdered materials used, weighed to the nearest 0.1 mg., were as follows:

| Ex. | Composition Prepared | $Eu_2O_3$ | $Na_2CO_3$ | $H_3BO_3$ | $ZnB_2O_4$ | ZnO |
|---|---|---|---|---|---|---|
| 6 | $Eu_{0.01}Na_{0.01}Zn_{0.98}B_2O_4$ | 0.2973 | 0.0895 | 0.4175 | 25.0000 | |
| 7 | $Eu_{0.05}Na_{0.05}Zn_{0.90}B_2O_4$ | 0.2402 | 0.0724 | 3.3776 | | 2.0000 |
| 8 | $Eu_{0.2}Na_{0.2}Zn_{0.6}B_2O_4$ | 0.7209 | 0.2171 | 2.5331 | | 1.0000 |
| 9 | $Eu_{0.3}Na_{0.3}Zn_{0.4}B_2O_4$ | 1.6220 | 0.4884 | 3.7997 | | 1.0000 |
| 10 | $Eu_{0.4}Na_{0.4}Zn_{0.2}B_2O_4$ | 2.1627 | 0.6512 | 3.7997 | | 0.5000 |
| 11 | $Eu_{0.5}Na_{0.5}B_2O_4$ | 3.0000 | 0.9033 | 4.2166 | | |

Figure 3:
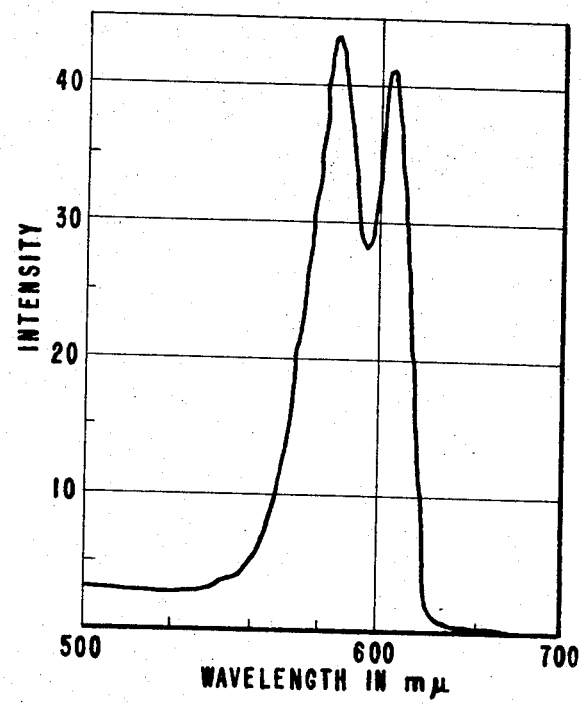

FIGURE 3 is a graph of the fluorescent emission spectrum of the product of Example 6, plotting wavelength in m$\mu$ versus intensity of fluorescene. It will be seen that this europium-sodium-substituted zinc borate is a line emitter of good fluorescent intensity.

The products of Examples 7 through 11 were similarly tested and, in this case, it was found that maximum fluorescence was exhibited by the composition $$Eu_{0.3}Na_{0.3}Zn_{0.4}B_2O_4$$

Figure 4:
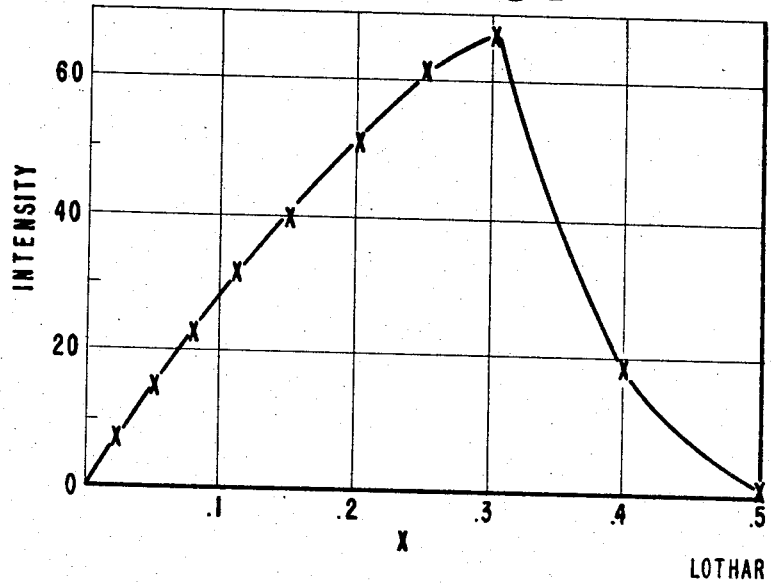

This is shown in FIGURE 4.

*Examples 12 through 16*

In the manner described in the preceding examples, rare earth sodium-substituted zinc borates were prepared using terbium oxide, $Tb_2O_3$, as the rare earth component. The compositions prepared and the amounts of powdered components used to prepare these were as follows:

| Ex. | Composition Prepared | $Tb_2O_3$ | $Na_2CO_3$ | $H_3BO_3$ | $ZnB_2O_4$ | ZnO |
|---|---|---|---|---|---|---|
| 12 | $Tb_{0.01}Na_{0.01}Zn_{0.98}B_2O_4$ | 0.3090 | 0.0895 | 0.4175 | 25.0000 | |
| 13 | $Tb_{0.02}Na_{0.02}Zn_{0.96}B_2O_4$ | 0.0468 | 0.0136 | 1.5832 | | 1.0000 |
| 14 | $Tb_{0.2}Na_{0.2}Zn_{0.6}B_2O_4$ | 1.4986 | 0.4342 | 5.0662 | | 2.0000 |
| 15 | $Tb_{0.3}Na_{0.3}Zn_{0.4}B_2O_4$ | 1.6859 | 0.4884 | 3.7997 | | 1.0000 |
| 16 | $Tb_{0.4}Na_{0.4}Zn_{0.2}B_2O_4$ | 2.2478 | 0.6512 | 3.7997 | | 0.5000 |

FIGURE 5 shows the intensity of fluorescence of the composition of Example 12 plotted versus the wavelength in m$\mu$. As in the compositions of the previous examples, this is shown to be a strong "line-emitter" composition.

In FIGURE 6 is plotted the intensity of fluorescence as a function of $x$ in the compositions $Tb_xNa_xZn_{1-2x}B_2O_4$, where $x$ has a value between 0.01 and 0.4. Maximum fluorescence is exhibited in this series of compositions when $x$ has a value of 0.2.

*Examples 17 through 20*

In the manner of the previous examples, a series of compositions was prepared having dysprosium as the rare-earth element. The compositions prepared and the weights of the reactants used to prepare them were as follows:

| Ex. | Composition Prepared | $Dy_2O_3$ | $Na_2CO_3$ | $H_3BO_3$ | $ZnBO_3$ | ZnO |
|---|---|---|---|---|---|---|
| 17 | $Dy_{0.01}Na_{0.01}Zn_{0.98}B_2O_4$ | 0.3150 | 0.0895 | 0.4175 | 25.0000 | |
| 18 | $Dy_{0.03}Na_{0.03}Zn_{0.94}B_2O_4$ | 0.1463 | 0.0416 | 3.2388 | | 2.0000 |
| 19 | $Dy_{0.05}Na_{0.05}Zn_{0.90}B_2O_4$ | 0.2546 | 0.0724 | 3.3776 | | 2.0000 |
| 20 | $Dy_{0.08}Na_{0.08}Zn_{0.84}B_2O_4$ | 0.4366 | 0.1240 | 3.6188 | | 2.0000 |

FIGURES 7 and 8 show intensity of fluorescence plotted, first, versus wave length in m$\mu$ and, second, against values of $x$ from 0.01 to 0.08. It will be seen from FIGURE 8 that maximum fluorescence is obtained when th value of $x$ is 0.03.

*Examples 21 through 23*

In these examples thulium was used as the rare-earth element in the rare earth-sodium substituted zinc borates.

The compositions prepared and the weights of reactants used were as follows:

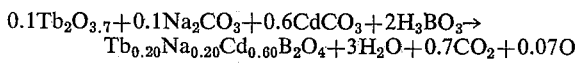

| Ex. | Composition Prepared | $Tb_2O_3$ | $Na_2CO_3$ | $H_3BO_3$ | $ZnB_2O_4$ | ZnO |
|---|---|---|---|---|---|---|
| 21 | $Tm_{0.01}Na_{0.01}Zn_{0.98}B_2O_4$ | 0.3258 | 0.0895 | 0.4175 | 25.0000 | |
| 22 | $Tm_{0.02}Na_{0.02}Zn_{0.96}B_2O_4$ | 0.0988 | 0.0271 | 3.1664 | | 2.5000 |
| 23 | $Tm_{0.04}Na_{0.04}Zn_{0.92}B_2O_4$ | 0.2062 | 0.0566 | 3.3040 | | 2.5000 |

FIGURES 9 and 10 show the intensity of fluorescence ploted against, first, the wavelength in m$\mu$, and second, the values of $x$ from 0.01 to 0.1 inclusive. It will be seen that in this series of compounds maximum fluorescence was obtained in the composition $Tm_{0.02}Na_{0.02}Zn_{0.96}B_2O_4$.

*Example 24*

To prepare a rare earth- and sodium-substituted cadmium borate of the formula $Tb_{0.20}Na_{0.20}Cd_{0.60}B_2O_4$, stoichiometric quantities of $Tb_2O_{3.7}$, $Na_2CO_3$, $CdCO_3$ and $H_3BO_3$ were weighed according to the following equation:

$$0.1Tb_2O_{3.7} + 0.1Na_2CO_3 + 0.6CdCO_3 + 2H_3BO_3 \rightarrow$$
$$Tb_{0.20}Na_{0.20}Cd_{0.60}B_2O_4 + 3H_2O + 0.7CO_2 + 0.07O$$

The amounts used, weighed to the nearest 0.1 mg., were as follows:

| | Grams |
|---|---|
| $Tb_2O_{3.7}$ | 1.458 |
| $Na_2CO_3$ | 0.4100 |
| $CdCO_3$ | 4.0000 |
| $H_3BO_3$ | 4.7824 |

These powders were thoroughly mixed and placed in a platinum tube, closed at one end, of ½" diameter. This tube, with the powder charge was placed in a furnace and heated to a temperature of 1200° C. This temperature was maintained for a period of 10 minutes, after which the furnace was slowly cooled at the rate of 1° C. minute to room temperature. The platinum tube was peeled from the glass bar and several parts of the bar were examined to determine fluorescent emission properties.

*Example 25*

To prepare a rare earth- and sodium-substituted cadmium-borate of the formula $Eu_{0.20}Na_{0.20}Cd_{0.60}B_2O_4$, storichiometric quantities of $Eu_2O_3$, $Na_2CO_3$, $CdCO_3$ and $H_3BO_3$ were weighed according to the following equation:

$$0.1Eu_2O_3 + 0.1Na_2CO_3 + 0.6CdCO_3 + 2H_3BO_3 \rightarrow$$
$$Eu_{0.2}Na_{0.2}Cd_{0.6}B_2O_4 + 3H_2O + 0.7CO_2$$

The amounts used, weighed to the nearest 0.1 mg., were as follows:

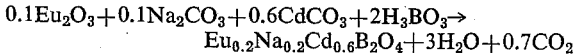

| | Grams |
|---|---|
| $Eu_2O_3$ | 1.0000 |
| $Na_2CO_3$ | 0.3011 |
| $CdCO_3$ | 2.9390 |
| $H_3BO_3$ | 3.5139 |

These powders were thoroughly mixed and placed in a platinum tube, closed at one end, of ½" diameter. This, with the powder charge was placed in a furnace and heated to a temperature of 1200° C. This temperature was maintained for a period of 10 minutes, after which the furance was slowly cooled at the rate of 1° C./minute to room temperature. The platinum tube was peeled from the glass bar and several parts of the bar were examined to determine fluorescent emission properties.

The above-described products as well as other rare earth- sodium-substituted zinc or cadmium borate compositions which were made within the scope of this invention, were analyzed for their crystalline structure by means of X-ray analyses. The Debye-Sherrer X-ray powder patterns which were obtained in no instance showed any of the the component materials to be present as such in any final composition. It was thus determined that in every case single-phase solid solution compounds were formed.

Compositions similar to those of the above examples were prepared comprising each of the rare earth metals of atomic numbers 58 through 71 in the Periodic Chart of the Elements. Many of these compositions, especially the neodymium compositions, exhibited fluorescent emission in the infra-red spectral range; however, only those comprising the elements samarium, europium, terbium, dysprosium, and thulium exhibited fluorescence in the visible spectrum.

I claim:

1. In a process for the production of luminescent compositions of generic formula $Ln_xNa_xA_{1-2x}B_2O_4$, where Ln is a rare-earth metal of atomic number 60, 62, 63, 65, 66, or 69, A is selected from the group consisting of $Zn^{+2}$ and $Cd^{+2}$, and $x$ has a value of 0.01 to 0.3 inclusive, the steps comprising (1) intimately mixing in stoichiometric amounts oxygen-containing compounds (a) of a said rare earth element, (b) of sodium, (c) of an element selected from the group consisting of zinc and cadmium, and (d) of boron; (2) heating said mixture at a temperature of about 1200° C. for from about 10 minutes to about one hour, and (3) cooling the product.

2. A single-phase, solid-solution luminescent composition of the generic formula $Ln_xNa_xA_{1-2x}B_2O_4$ where Ln is a rare-earth element of atomic numbers 60, 62, 63, 65, 66, or 69, A is selected from the group consisting of $Zn^{+2}$ and $Cd^{+2}$, and $x$ has a value of 0.01 to 0.3 inclusive.

3. A single-phase, solid-solution luminescent composition of formula $Sm_{0.05}Na_{0.05}Zn_{0.90}B_2O_4$, characterized in that, on excitation by electromagnetic radiation in the ultraviolet region of the spectrum, luminescence by emission of light over a very narrow range of spectral wavelength occurs.

4. A single-phase, solid-solution luminescent composition of formula $Eu_{0.3}Na_{0.3}Zn_{0.4}B_2O_4$, characterized in that, on excitation by electromagnetic radiation in the ultraviolet region of the spectrum, luminescence by emission of light over a very narrow range of spectral wavelength occurs.

5. A single-phase, solid-solution luminescent composition of formula $Tb_{0.2}Na_{0.2}Zn_{0.6}B_2O_4$, characterized in that, on excitation by electromagnetic radiation in the ultraviolet region of the spectrum, luminescence by emission of light over a very narrow range of spectral wavelength occurs.

6. A single-phase, solid-solution luminescent composition of formula $Dy_{0.03}Na_{0.03}Zn_{0.94}B_2O_4$, characterized in that, on excitation by electromagnetic radiation in the ultraviolet region of the spectrum, luminescence by emission of light over a very narrow range of spectral wavelength occurs.

7. A single-phase, solid-solution luminescent composition of formula $Tm_{0.02}Na_{0.02}Zn_{0.96}B_2O_4$, characterized in that, on excitation by electromagnetic radiation in the ultraviolet region of the spectrum, luminescence by emission of light over a very narrow range of spectral wavelength occurs.

8. A single-phase, solid-solution luminescent composition of formula $Tb_{0.20}Na_{0.20}Cd_{0.60}B_2O_4$, characterized in that, on excitation by electromagnetic radiation in the ultraviolet region of the spectrum, luminescence by emission of light over a very narrow range of spectral wavelength occurs.

9. A single-phase, solid-solution luminescent composition of formula $Eu_{0.20}Na_{0.20}Cd_{0.60}B_2O_4$, characterized in that, on excitation by electromagnetic radiation in the ultraviolet region of the spectrum, luminescence by emission of light over a very narrow range of spectral wavelength occurs.

10. A laser having as an essential component thereof a single-phase solid solution luminescent composition according to claim 2.

11. In a method for amplification of light by stimulated emission of radiation the step comprising stimulating by electromagnetic radiation a single-phase, solid solution luminescent composition according to claim 2, whereby light of 450 to 1070 m$\mu$ wavelengths in a very narrow spectral range is emitted therefrom.

References Cited

UNITED STATES PATENTS

| | | | |
|---|---|---|---|
| 2,270,124 | 1/1942 | Huniger et al. | 252—301.4 |
| 3,243,723 | 3/1966 | Van Uitert | 252—301.4 |
| 3,250,722 | 5/1966 | Borchardt | 252—301.5 |
| 3,254,031 | 5/1966 | DePaolis et al. | 252—301.4 |
| 3,294,701 | 12/1966 | Vogel et al. | 252—301.6 |

OTHER REFERENCES

"The Industrial Application of Luminescence," Sommer-Electronic Engineering December 1946, p. 361.

Kroger: "Some Aspects of the Luminescence of Solids," 1948, pp. 288-298.

Johnson et al. "Continuous Operation of a Solid State Optical Maser," Physical Review, vol. 126, No. 4, May 15, 1962, pp. 1406-9.

TOBIAS E. LEVOW, Primary Examiner.

ROBERT D. EDMONDS, Assistant Examiner.